Figure 1:
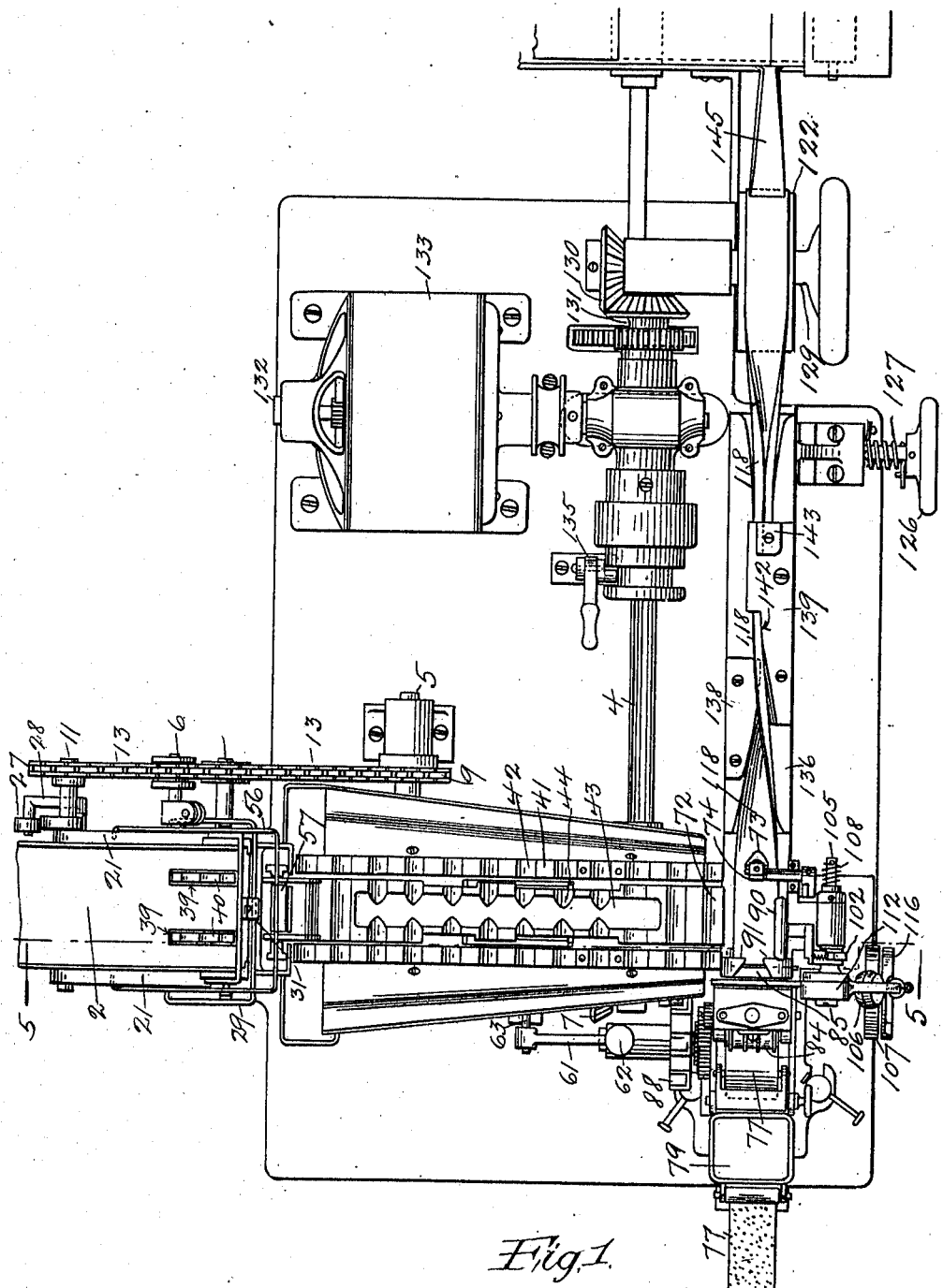

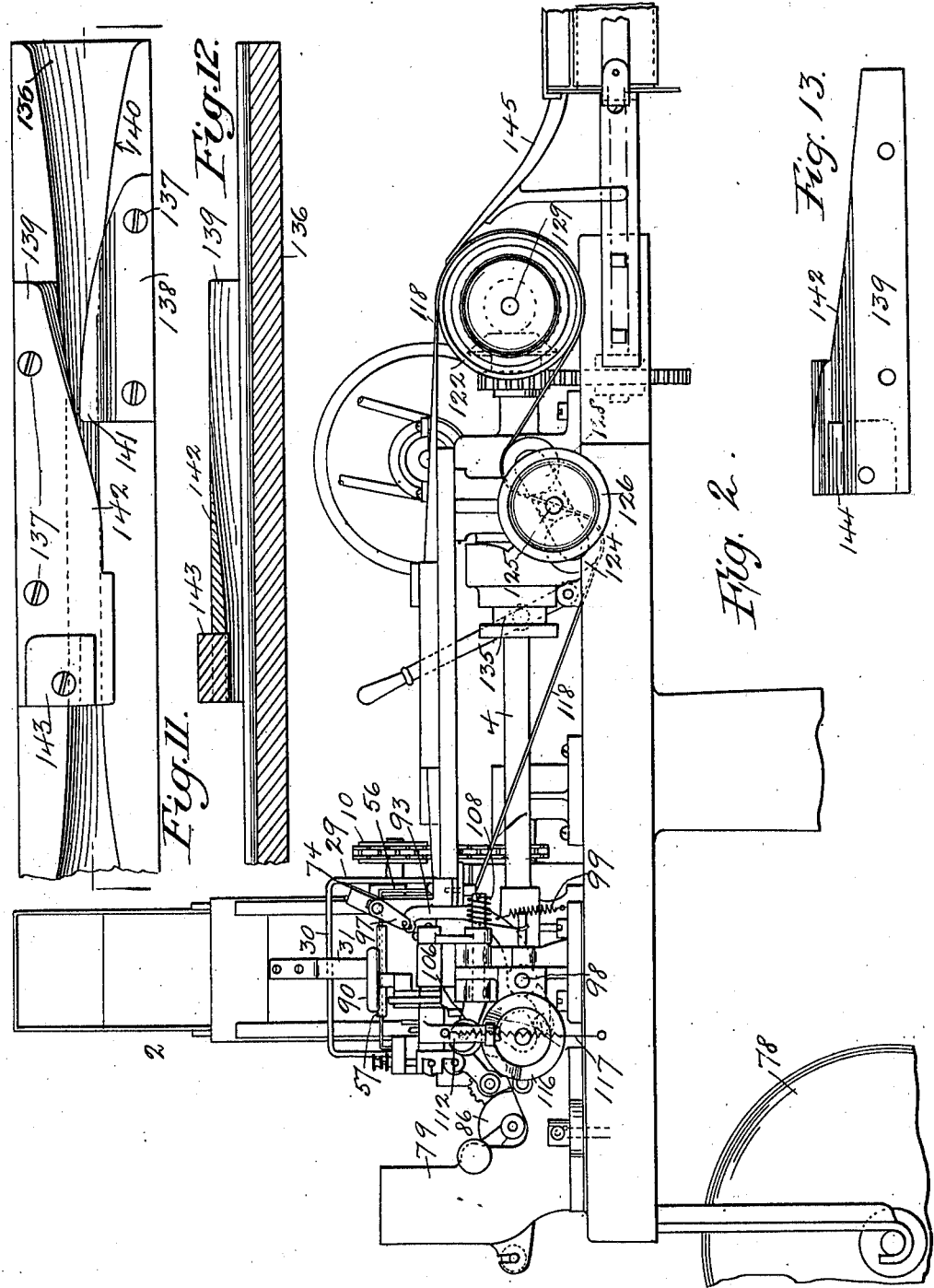

J. C. DRUCKLIEB & C. SIMON.
CIGARETTE TIPPING MACHINE.
APPLICATION FILED FEB. 12, 1910.
988,985.
Patented Apr. 11, 1911.
8 SHEETS—SHEET 3.
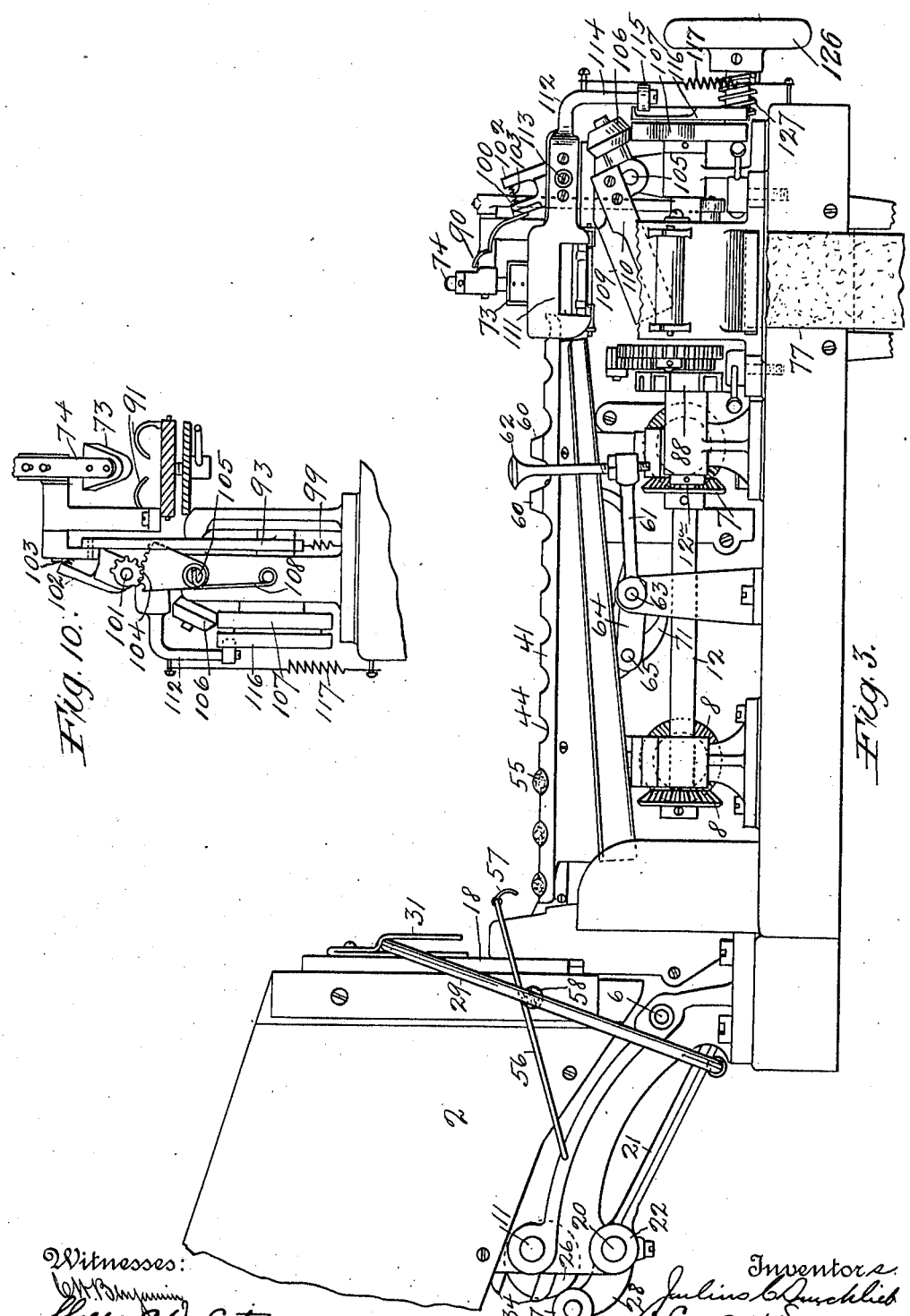

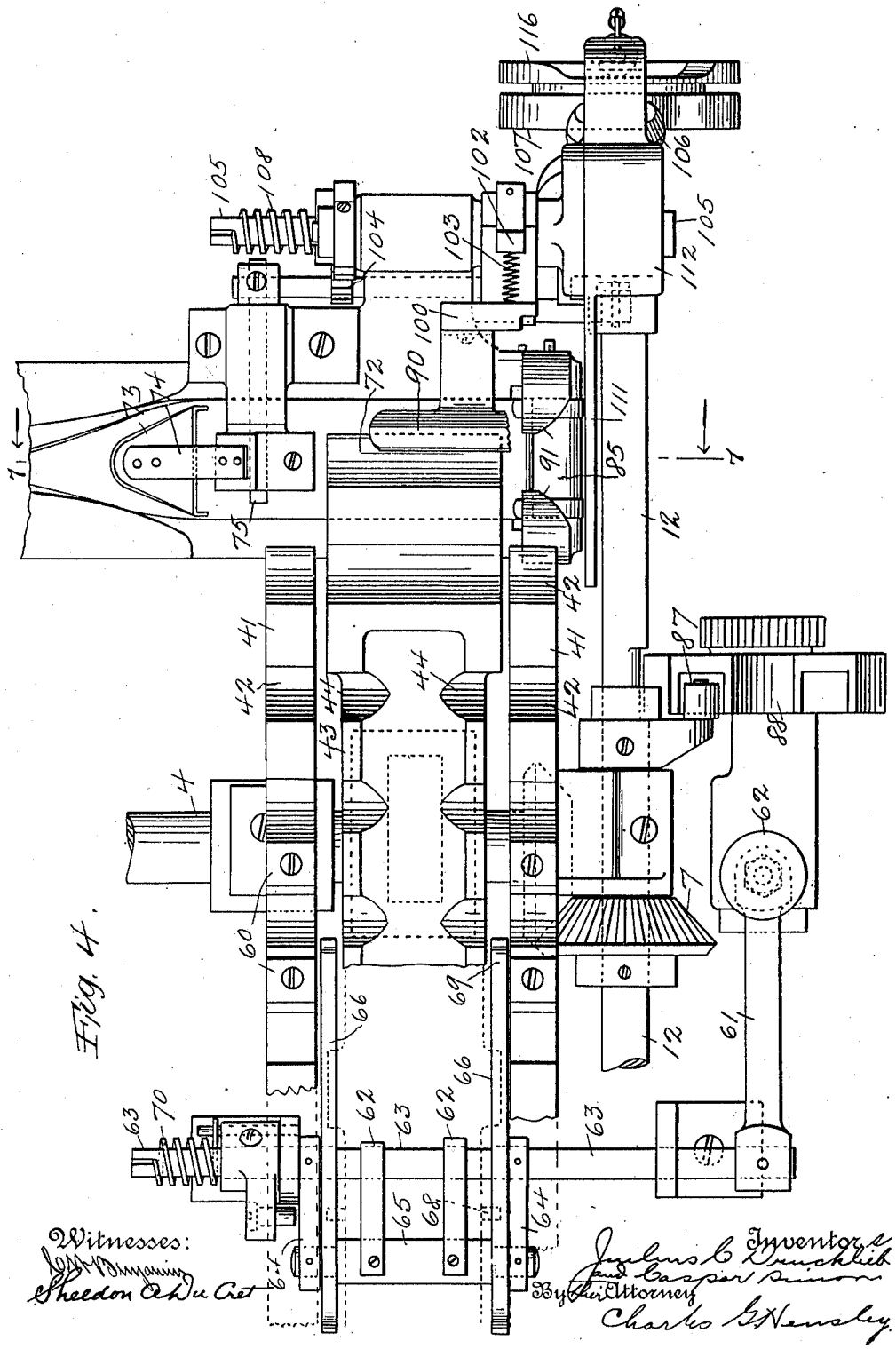

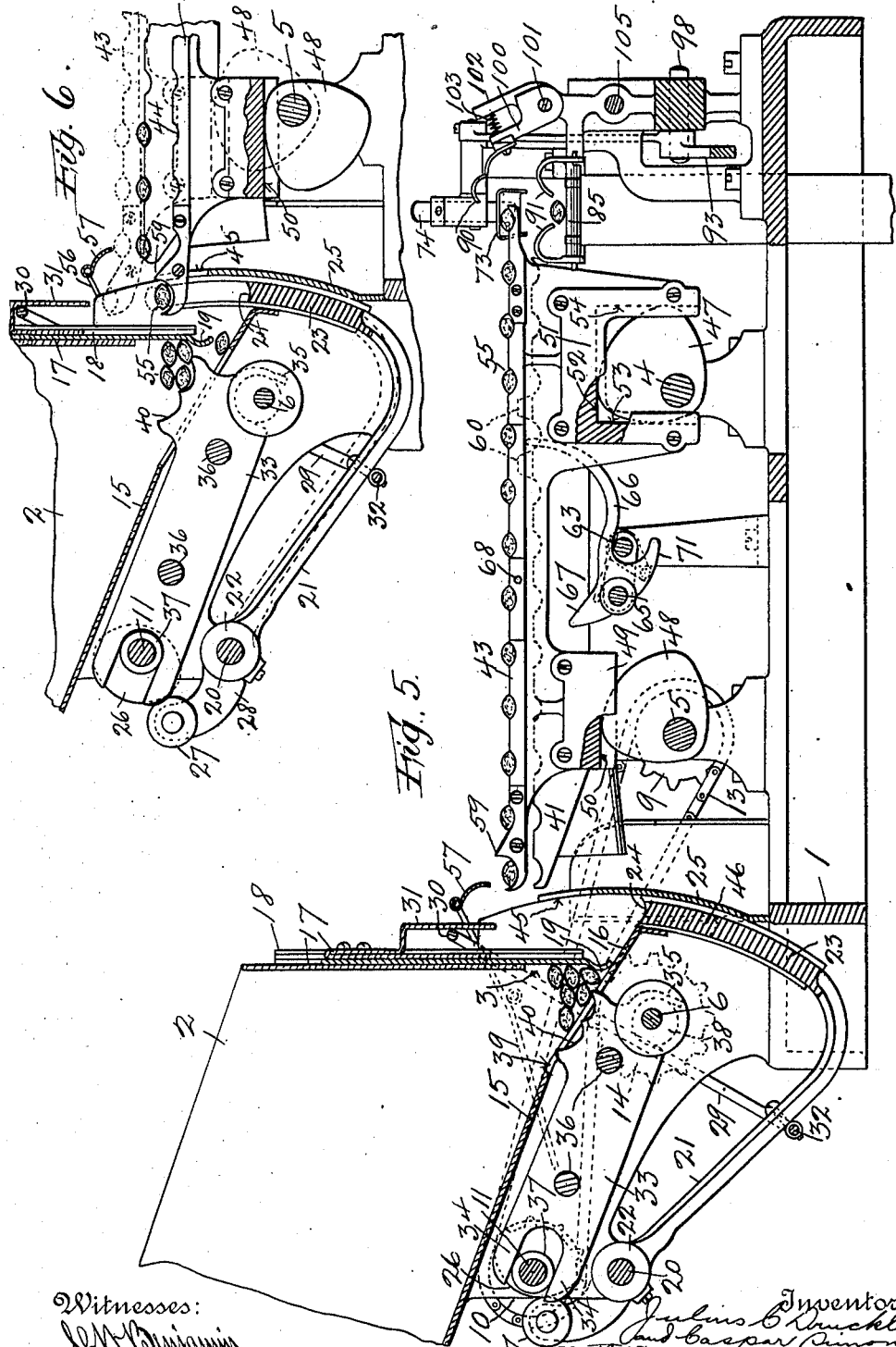

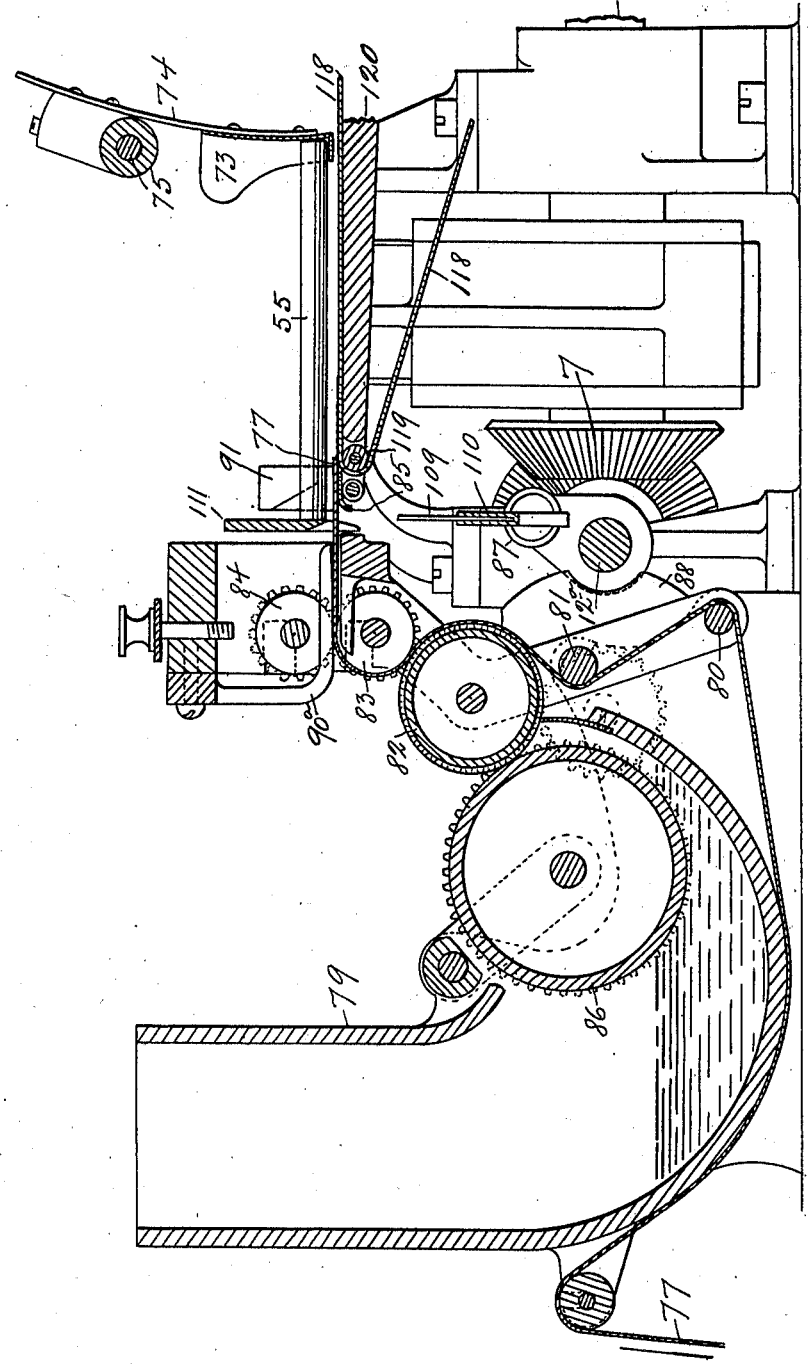

J. C. DRUCKLIEB & C. SIMON.
CIGARETTE TIPPING MACHINE.
APPLICATION FILED FEB. 12, 1910.
988,985.
Patented Apr. 11, 1911.
8 SHEETS—SHEET 8.
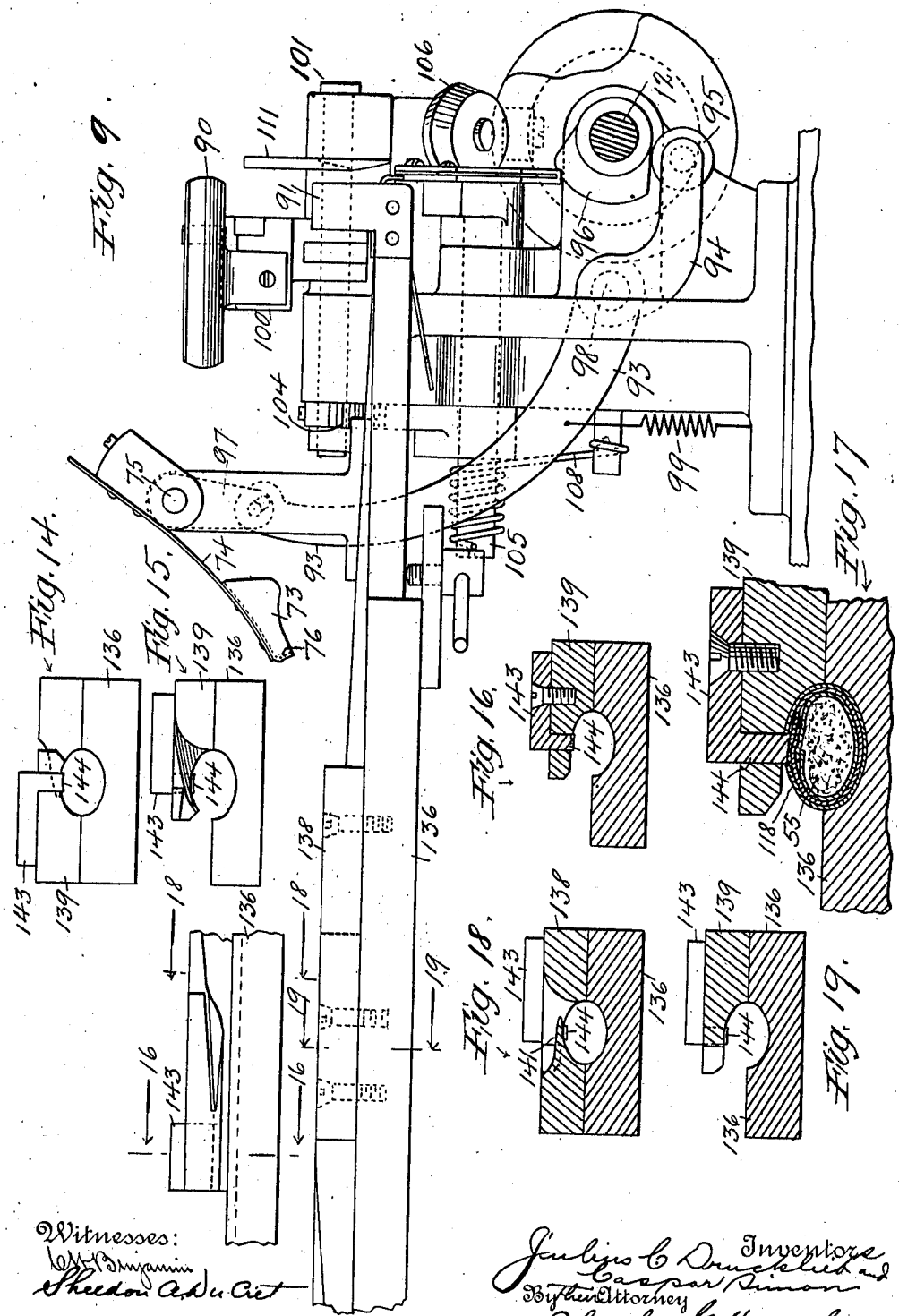

UNITED STATES PATENT OFFICE.

JULIUS C. DRUCKLIEB, OF NEW YORK, N. Y., AND CASPAR SIMON, OF RIDGEFIELD PARK, NEW JERSEY, ASSIGNORS, BY DIRECT AND MESNE ASSIGNMENTS, TO CHARLES A. DRUCKLIEB, OF STAPLETON, NEW YORK.

CIGARETTE-TIPPING MACHINE.

988,985.  Specification of Letters Patent.  Patented Apr. 11, 1911.

Application filed February 12, 1910. Serial No. 543,564.

*To all whom it may concern:*

Be it known that we, JULIUS C. DRUCKLIEB, of New York, in the county of Kings and State of New York, and CASPAR SIMON, of Ridgefield Park, in the county of Bergen and State of New Jersey, have invented certain new and useful Improvements in Cigarette-Tipping Machines, of which the following is a specification.

The present invention relates to machines for applying cork or other material to the ends of individual cigarettes to form a mouth piece or tip, and as cork is usually used for tipping material we will hereafter refer to the tipping material as cork.

Various attempts have been made to produce a machine for applying tips to cigarettes. In most cases the attempts have been entirely unsuccessful, while in others they have been only partially successful, producing many properly tipped cigarettes while causing such a number of discards that the value of the attempts have always been doubtful. In order to meet the very exacting requirements of the trade the tips must be placed even and straight on the cigarettes, they must all be of the same proportion, the seams of the tips must be uniform and the machine must be capable of turning out a quantity of work. Previous attempts have been more or less failures because the device for applying the tips about the ends of the cigarettes usually consisted of movable elements which change their direction of movement, such as rocking, oscillating or reciprocating elements, all of which have been slow and inaccurate and noisy in their operation.

The purpose of the present invention is to provide a machine wherein the cigarettes, when in contact with the cork which is to form the tip, are carried by a tape or belt through reverse, alternately operating folding elements which will cause the free ends of the tip to be pressed upon the cigarette to cause the tip which has been previously supplied with paste, to adhere about the cigarette to form an even, properly applied tip.

The present invention comprises improvements extending over the entire machine, from the hopper to which the cigarettes are supplied by hand, to the device for completing the application of the tip and while many of the elements and combinations are susceptible of separate use the entire machine as a whole has produced very satisfactory results.

The cigarettes are placed by hand in a hopper or reservoir from which they are fed singly by a novel and efficient device which will feed a cigarette at each operation to a carrier and which will not injure the cigarettes and will deliver but one to the carrier at each operation, thereby preventing the cigarettes from overloading the carrier. The carrier which receives the cigarettes from the hopper transmits the cigarettes step by step to a tipping mechanism and consists of movable and stationary elements coöperating to produce a step by step travel of the cigarettes, whereby they will be successively presented to the tipping mechanism and the carrying or conveying device embodies novel improvements which eliminate many of the objections of other mechanisms. The carrier presents the cigarettes laterally to a position for a primary engagement with a piece of pasted tipping material which is fed from a continuous strip, and when the tip and cigarette have been brought into proper relation with each other the cigarette is released and is carried by a continuous tape or belt through a folder having reverse folding plates which will reversely bend the free ends of the tip upon the cigarette and alternately, so that the tip will surround the cigarette and the ends will overlap to form a seam. The belt (as the propelling means will be termed herein) is flexible and adapted to take the curve of the folder, so as to properly engage the cigarette to produce sufficient contact with the cigarette and tip to propel them through the folder. The contact of the cigarette and partially applied tip with the propelling belt causes them to be propelled evenly and prevents the partially applied tip from moving on the cigarette while they are being propelled through the folder, so that the tip, once properly positioned flush with the end of the cigarette, will not be displaced while the tipping is being completed. We prefer to make the folder of stationary elements, so that all unnecessary movements in the tipping device may be avoided. It is desirable that the propelling belt move continuously as otherwise an intermittent movement would cause the cigarettes to be displaced on the belt when they are left free to travel therewith; and if the belt stops while the cigarettes rest freely thereon the belt would have to start slowly each time to overcome the inertia of the cigarette without displacing it thereon. For this reason the belt has been made to travel continually, while the cigarettes are placed thereon one by one and once they begin to move with the belt their movement is uniform and continuous in one direction. We therefore prefer to feed the cork or other tipping material primarily over a stationary element, here shown as a plate, which is disposed near the propelling belt and the cigarettes as they are fed singly by the carrier are positioned with relation to the cork and a contact therewith is caused, when the cigarette is released and its frictional contact with the propelling belt causes it to travel, with the tip in partial contact therewith, through the folder where the application of the tip is completed. In moving with the belt the cigarette makes way for another cigarette and tip and this operation continues and the machine may be operated at a good speed. There are novel features in the knife action and in the various details throughout the machine.

It is necessary in producing a cigarette of good appearance, to apply the tip to the cigarette so that the seam of the tip will come on the same side of the cigarette as the seam of the cigarette, and on the side opposite the brand or other marking, but as the cigarettes are placed in bulk in the hopper they are apt to be fed by the carrier with either side up and we have therefore provided means for acting upon the cigarettes intermediate the hopper and the tipping mechanism for turning the cigarettes whenever necessary, so that the cigarettes will be so positioned when presented to the tipping device that the seam of the tip will come on the same side of each cigarette.

The present description it will be understood deals with oval cigarettes which is now the standard shape. As the cigarettes when moving along the carrier may come with one side or the other up, it is necessary to turn over only some of the cigarettes. It may be that several consecutive cigarettes will have to be turned, while again a number may appear in the right position and to turn the several cigarettes by hand would be very unsatisfactory and yet, owing to the fact that the positions can not be predetermined it is not possible to have the machine operate entirely automatically. It is therefore necessary that the turning device be at least initiated by manual operation. We have therefore produced a simple and efficient device which will act singly upon the several cigarettes, in a given position, initiated by hand, but operated by the machine itself. The object of this is that while the turning of the cigarettes is initiated by hand the exact moment of turning is determined by the machine, so as to turn the cigarettes when in a position suitable therefor. If the operator perceives several cigarettes in consecutive positions all of which have to be turned the operator simply presses a plunger and holds it down, when each cigarette as it comes to a given position will be automatically turned over, and each cigarette will be turned so long as the plunger is depressed.

In the present invention there are many features of improvement in the details of the machine as will appear hereinafter.

Figure 7:
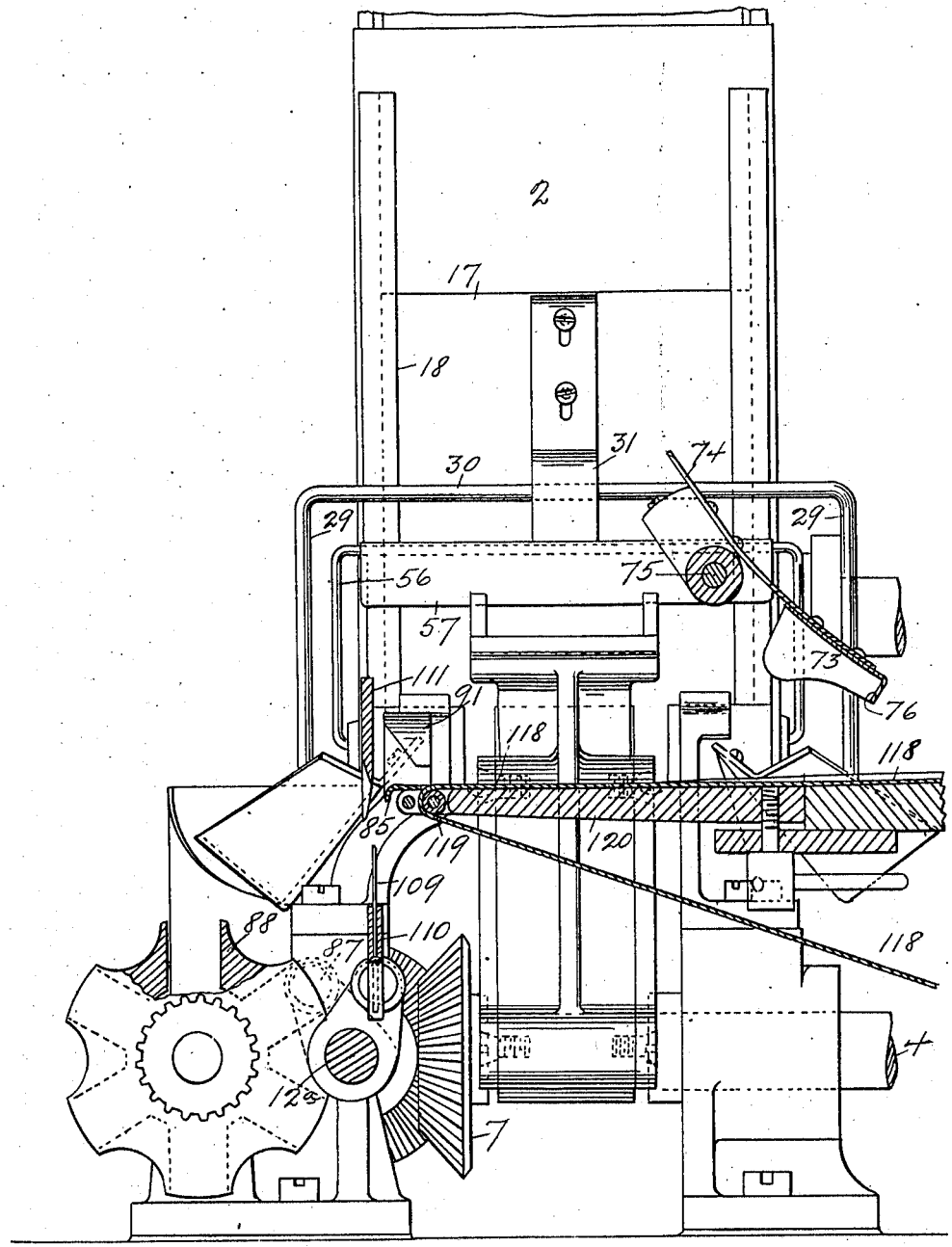

In the drawings forming a part of this application, Figure 1 is a plan view of the preferred embodiment of our invention, Fig. 2 is a front elevation of the machine, Fig. 3 is a side elevation of the same, with some parts omitted or broken away, Fig. 4 is an enlarged plan of part of the carrier and the mechanism for positioning the cigarettes on the tip, Fig. 5 is a section taken on the line 5—5 of Fig. 1, Fig. 6 is a section of part of the same mechanism shown in Fig. 5, showing the parts in a different position, Fig. 7 is an enlarged longitudinal sectional view taken on the line 7—7 of Fig. 4, Fig. 8 is a similar view including the pasting device and cork feeder, Fig. 9 is a longitudinal sectional view of a portion of the machine, Fig. 10 is a cross section showing part of the mechanism for positioning the cigarettes, Fig. 11 is a plan view of the folder, Fig. 12 is a longitudinal section thereof, taken on the line 12—12 of Fig. 11, Fig. 13 is an inverted plan view of the last part of the folder showing the plate which finally wipes or presses the tip seam, Figs. 14 and 15 are end views of each end of the folder, Figs. 16 and 17 are cross sections of the folder on the line 16—16 of Fig. 9, showing the same before and during the passage of a cigarette therethrough, respectively and, Figs. 18 and 19 are cross sections of the holders taken on the lines 18—18 and 19—19 respectively of Fig. 9.

In describing the present invention we will take up the various parts of the mechanism in the order of their operation, following the cigarette from the time it is introduced into the hopper until it emerges from the machine completely tipped and ready for packing.

The various mechanisms are shown supported upon a suitable base 1, directly, and through the instrumentality of various standards which will be apparent from the drawings and the supporting members may be varied to suit the requirements.

The cigarettes, in quantities, are placed in the supply hopper 2, to be automatically fed therefrom for supplying the machine and though the shape of this hopper may be changed we prefer to use that shown, wherein the bottom gradually slants downward toward the front, where the casing is provided with an opening for the delivery of the cigarettes. There are several shafts 4, 5, 6, and 11, which are mounted in what we consider a position longitudinally of the machine, but laterally of the cigarette feeding mechanism, which are operated from a source of power as will appear and which are geared to run in synchronism with each other. The shaft 5 is operated from the shaft 4 through the intermediate shaft 12, which is operated by shaft 4 by miter gears 7, and which in turn operates shaft 5 through the miter gears 8. The shaft 5 in turn is provided with a sprocket 9 and the shaft 11 with a sprocket 10; and a chain 13, traveling over these sprockets causes the shaft 11 to be driven from shaft 5. The shaft 6 is also provided with a sprocket 14 with which the chain 13 engages whereby this shaft is operated by the chain.

As the cigarettes move down the bottom 15 of the hopper they are permitted to pass through the opening 3 to the outer shelf 16, by means of a reciprocating door or cut off 17, which travels up and down in tracks 18, on the front of the hopper; and this cut off is preferably curved at 19 so as not to injure the cigarettes by having its lower edge strike the cigarettes straight. The shaft 20 suitably supported below the hopper forms a support for a rocking frame, consisting of the arms 21, connected by a cross piece 22, which is journaled upon the shaft 20 and on which the frame rocks. The arms 21 carry a curved raising plate or lifter 23, which travels in the arc of a circle and moves between a guard 25 and the lower end of the shelf 16 and in its lowest position the upper grooved edge 24 is low enough to receive the cigarettes as they come down the shelf, the plate 23 then rises, carrying the cigarettes one at a time upward at each operation. The rocking frame is operated from the shaft 11 by means of a cam 26 on the latter which engages a roller 27 on the arm 28 of the frame, causing the forward end of the frame to rock and carry a cigarette from the shelf 16 up to the carrier, upon the grooved top 24 of the plate 23. The door or cut off 17 is preferably operated in conjunction with the movable frame and we have therefore provided arms 29, connected by a cross bar 30, which engages under the bent over plate 31, of the door or cut off for the purpose of raising the same; and they are also connected by another cross bar 32, which is fulcrumed to the arms 21 of the movable frame, to be operated therewith. As the movable frame rocks it moves the bars 29, 30, upward and the latter engaging the plate 31 moves the cut off 17 upwardly enough to permit one cigarette to discharge through the opening 3 of the hopper, down the shelf 16 and on the lifting plate. Upon each downward movement of the bar 30 the cut off is free to return by its own gravity which will be sufficient to cut off the cigarettes in the hopper, but will not injure the cigarettes. The coöperation of the cut off and rocking frame causes the former to be properly timed. As cigarettes, especially oval shape, are apt to form a bridge near the discharge opening we have provided a novel device for agitating the cigarettes near the hopper discharge opening which will not injure the cigarettes, but which will prevent clogging or bridging. For this purpose we have provided plates 33, which are united by the cross bars 36, to form a unit; and these plates, lying under the slanting bottom of the hopper are provided with jaws 34 and 35, which engage the cam 37 on shaft 11 and the cam 38 on the shaft 6 respectively and which support the plates 33. The rotation of the cam 38, imparts a movement to the plates 33, which latter, projecting through the apertures 39, in the bottom of the hopper agitates the cigarettes near the point of discharge to prevent clogging; and to facilitate such action the edges of the plates 33 where they pass through the hopper bottom are serrated at 40.

As the cigarettes are raised one at a time by the rocking frame they are received upon a carrier or conveyer which conveys the cigarettes singly, step by step, to a tipping device. The carrier consists of stationary and movable platforms, the latter being adapted to raise the cigarettes and convey them along the stationary platform by a step by step movement.

The stationary platform consists of parallel plates 41, with transverse grooves 42, for receiving the cigarettes thereacross and the grooves are arranged at regular intervals along the stationary platform beginning at a point near the movable raising frame and terminating near the tipping mechanism. The movable part of the carrier consists of a platform 43, which preferably lies between the two stationary platform plates and it is also provided with grooves 44 on top to receive the cigarettes crosswise and they correspond with the grooves in the stationary platform, with which at one period of operation they are adapted to aline.

The movable platform is operated by mechanism which will impart a rectangular movement thereto, whereby the same will have as little movement as possible. As previously stated, the movable platform is provided with grooves for receiving the cigarettes and they are spaced apart the same distance as the grooves on the stationary platform. The movable platform is preferably made of less width than the length of the cigarettes, and its rear end is adapted to pass through the cut out 45 of the guard 25 and the cut out 46 of the raising member 23, until the groove on the end of the movable platform alines with the groove of the member 23, when the latter is raised.

It will be observed that there are provided cams 47 and 48, on the shafts 4 and 5 of a peculiar shape, for the purpose of imparting a rectangular movement to the movable platform. The movable platform is shown provided with pockets for these cams which to a certain extent correspond to each other, but which we prefer to construct so, that while both cams operate to produce the up and down movement of the platform only one operates to produce the longitudinal movement, thereby making the movement smooth. One of these prockets consists of depending plates 49 on opposite sides of the cam which simply guides the platform, while the face 50 rests upon the periphery of cam 48 and is actuated by the latter, but as it only engages the cam at one place at a time it is simply raised and lowered by it, though it naturally follows the movable platform in other movements imparted by the other cam. The cams 47 and 48 are preferably so formed that they will not impart an eccentric movement to the platform, but will move the same rectangularly. The second cam pocket consists of plates 51, which simply guide the platform the same as the plates 49. The interior of this pocket is provided with a plurality of cam faces. There is a top, flat cam face 52, and upright flat cam faces 53, 54, which coöperate with the cam 47 to produce the rectangular movement of the movable platform. When the cams move, the cam 47, operating on its several cam faces produces a movement in the carrier first to the left in Fig. 5, on a plane below the plane of the stationary platform, until the movable platform comes to the position shown in full lines in Fig. 6. In doing this the rear end of the platform passes under the cigarette 55, on the lifter 23, until one of the grooves of the platform comes under the cigarette. A continuation of the movement of the cams causes the movable platform to move vertically until it assumes the position shown in dotted lines in Fig. 6. In doing so the platform lifts the cigarette from the lifter 23 and if there are any cigarettes in the grooves of the stationary platform they will be raised also, being carried in the grooves of the movable platform. The next movement imparted by the cams will be to the right, equal to the distance between two consecutive grooves, and the movement will be a longitudinal one. Upon the termination of the longitudinal movement the movable platform will ride down vertically upon the cams in its advanced position. In doing so the cigarette which was just removed from the lifter will be deposited in the first groove of the stationary platform and any cigarettes lifted from the stationary platform will be replaced in the next succeeding groove to the right, or toward the front of the machine. This operation is continually repeated, and the cigarettes are thus conveyed from the source of supply to the tipping device. The rectangular movement of the movable platform is a decided improvement as it materially reduces the extent of movement of the movable platform, making its action smooth, and the grooves in the carrier may be placed close to each other.

It is possible that in feeding cigarettes to the carrier the raising plate 23 will sometimes carry up more than one cigarette at a time and we have provided means for preventing this. For this purpose we have provided rods 56 fulcrumed at one end and carrying on their forward ends a cross plate 57 which swings freely thereon and which trips on the projections 59 on the carrier. The arms 56 swing freely and rest upon pins 58. Should more than one cigarette at a time be fed in the first groove of the movable platform the plate 57 in tripping over the projections 59 will throw any cigarette other than the one intended to be fed back, to be fed singly; and without dislodging the cigarette in the first groove of the platform.

As previously stated we have provided a device for turning over the cigarettes whenever they are improperly positioned as they come on the carrier and as this device acts upon the cigarettes while they are on the carrier we will here describe such device.

We preferably provide extensions 60 on the stationary platform for guiding the cigarette during the turning over action and this may be considered as the turning station for the cigarettes. We have provided a lever 61, which is preferably provided with a rod 62 by which it is manually operated by the operator, and the lever is connected with a shaft 63 which it is adapted to rock. The shaft 63 carries rearwardly extending arms 64, preferably under the carrier, to which is secured a floating shaft 65, the latter being disposed laterally under the carrier; and there are rocking arms or levers 66, carried by the floating shaft. These arms or levers 66 are adapted to be operated by the machine, preferably by the carrier itself and to cause the cigarette to be turned in the carrier whenever the operating lever 61 is depressed. The nose 67 of the levers 66 are so positioned that they may be engaged by the pins 68 on the movable platform or carrier when positioned for that purpose. The other end 69 of the levers 66 are carried forward of the lever fulcrum, preferably, and are curved up sufficiently to bring their ends under the cigarette which lies in the groove between the extensions 60 on the stationary platform. On the shaft 63 we have provided a coil spring 70 (see Fig. 4) which exerts a torsional stress upon the shaft 63 for the purpose of retaining the parts in the position shown in Fig. 3, which is the normal or inactive position. A nose 71 on the levers 66, projecting under the shaft 63, limit the swing of the lever in one direction and the springs 62, on the shaft 65 rest upon the shaft 63 and cushion the downward movement of the lever. If the operator sees that the cigarette which is about to be moved to the groove between the projections 60 is wrongly positioned, he simply depresses the rod 62 and holds it there until the cigarette is turned over to present the correct side up, and if several successive cigarettes are about to appear at the turning station which require turning he simply holds the rod 62 until all the cigarettes have been turned when he releases it and the cigarettes then feed in their original position until the rod is again depressed.

The operation of the turner is such that the operator simply initiates the turner, while the machine itself performs the turning operation. Depressing the rod 62 oscillates the shaft 63, and the rocking of the arms 64 therewith moves the shaft 65 upward until the pins 68 on the movable carrier will engage the nose 67 of the turning lever upon the movement of the latter to the left in Fig. 5. This engagement will cause the levers 66 to be rocked on their shaft and the ends 69 of these levers strike one side of the middle of the oval cigarette in the turning station and this causes the cigarette to be turned a half turn without displacing it from its groove. If the operating lever is retained down by the operator the movable carrier will engage, through the pins 68 the nose of the levers 66 on each operation and will turn each cigarette as it is fed in the turning station, until the initiating lever is released by the operator. It will be apparent that the turning action is properly timed with relation to the position of the cigarette and the operator does not have to be as exact in timing the initiation of the turner as if he really did the turning. The turning is really done by the machine, but is initiated by the operator, and the operation is timed by the carrier, the very action of which it should correspond with.

When the cigarette travels the length of the stationary platform it is finally taken by the movable element of the carrier and is placed in position to be tipped. When the cigarette is taken from the last groove in the stationary platform it is carried in the groove 72 of the movable platform, when it will be lowered into the tipping device. As the cigarette goes down there is a swinging member 73, resiliently supported from an arm 74 on the shaft 75, which presses the cigarette against the upper knife and the lip 76 on the member 73 sustains the cigarette in the air slightly above the propelling belt and the tip receiving plate as shown in Fig. 8. The cigarette is thus suspended while the cork strip is being fed under the end of it and being cut to provide a piece sufficient to form a tip for the cigarette.

The cork 77, or other tipping material is supplied in the form of a bobbin 78, from which it passes under the paste pot 79, around the pins 80, 81, partially around the paste roller 82, from which it is fed between the rollers 83, 84, and the free, pasted end is placed over the plate 85, which rests below the end of the cigarette as the latter is held by the member 73. The paste is taken by a roller 86, from the paste pot and is fed to the roller 82, from which it passes to the cork strip. The cork is fed forward intermittently by the feed rollers 83, 84. On the shaft 12 there is a roller 87, which engages in the gear 88 and moves the latter step by step; and through a chain of gears the several rollers 86, 82, 83, and 84, are intermittently operated to paste and feed the cork intermittently.

When the end of the cork is fed over the plate 85, pasted side up, the cigarette is held in the position shown in Fig. 8. The upper knife blade 111 moves down to the surface of the cork and the lower knife blade 109 comes up and severs a piece of cork from the strip, leaving the severed piece on the plate 85 where it had been fed, ready to receive the cigarette. The cigarette is then pressed down by the pressing finger 90 until it rests partly on the cork which has been severed from the strip and partly on the traveling belt. The member 73 by that time has been swung out free of the cigarette. When the cigarette is pressed upon the cork the latter partly adheres thereto and the pressing finger 90 is then raised, when the cigarette, being left free will begin to travel with the propelling belt, and will carry the cork with it. It is understood that the cork is flush with the end of the cigarette when they are united and the cork is of sufficient width to be folded around the cigarette and form an overlapping seam. When the cigarette is forced down on the cork it passes between the guiding fingers 91, which cause the cigarette to be properly positioned laterally in relation to the cork.

The mechanism for operating the member 73 for positioning the cigarette longitudinally over the cork and for temporarily holding it suspended, is shown more fully in Fig. 9. The arm 97 on the shaft 75 is rocked by a lever 93, which latter is rocked on its fulcrum 98, by means of a cam 96, on the shaft 12 which engages a roller 95 on the end 94 of the lever. The spring 99 tends to keep the roller 95 in continual contact with the cam 96. In Fig. 8 the member 73 is shown supporting the cigarette while in Figs. 7 and 9 it is shown swung out to let the cigarette pass on.

The means for operating the pressing finger 90 is shown in Figs. 1, 3, 4, 5, 9, and 10. The finger 90 is carried on a short arm 100, which is journaled on a shaft 101, and an arm 102 on the same shaft exerts its movement upon the arm 100 through the interposed spring 103 so that the action of the finger 90 will be resilient and will not destroy the cigarettes. The shaft 101 is oscillated by means of the segmental gears 104, from the shaft 105. The latter is operated by means of a cam 107 (see Fig. 3) which is engaged by a roller 106 carried on an arm on the shaft 105, against the action of the spring 108. The lower knife blade 109 is carried by the arm 110, which rocks with the shaft 105. The upper knife 111, (see Fig. 3) is carried by an arm 112 which is fulcrumed at 113 and the downwardly extending end of the arm carries a roller 115 which travels in the groove of the dish cam 116, by which the knife arm is rocked. A spring 117 retains the roller in contact with the cam 116. We prefer to make both knife blades movable, with a greater movement in the lower than the upper blade.

The cigarettes are fed in a direction preferably at right angles to the direction of travel of the propelling belt, while the cork is fed in the same direction as the travel of the belt. The propelling belt preferably travels continuously and when the mechanism previously described has fed the cigarette, the pasted cork under the cigarette, and pressed the cigarette to the cork, the latter is resting flat with the cigarette in contact therewith and upon the releasing of the cigarette it immediately begins to travel with the belt and is carried through the folder where the tip is pressed upon the cigarette, completing the operation The propelling belt is shown more clearly in Figs. 1, 2, 7, and 8. The belt 118 is shown continuous and passes around a small idler 119 which is placed as close as possible to the cork receiving plate 85, so that the cigarette will contact with the belt when brought down thereon for considerable of its length. The belt passes over the table 120, through the folder and around a propelling pulley 122; and thence around the tension rollers 123, 124, and to the roller 119 again. The tension rollers 123, 124, revolve on the arm 128 about the shaft 125 and a spring 127 (see Fig. 1) exerting stress upon the shaft 125 keeps the propelling belt taut. The belt may be temporarily slackened by turning the hand wheel 126. The propelling pulley is carried on a shaft 129 which is propelled from the shaft 131, through the miter gears 130. The shaft 131 is driven from the shaft 132 which is the shaft to which the power is supplied either from the motor 133, or any other source of power. The same shaft 132 distributes power to the various other mechanisms through the shaft 4 and the clutch 135 serves to throw the machine on or off.

When the cigarette is left free on the belt with the tip partially adhering thereto it immediately begins to travel with the belt until it passes through the folder and is then discharged in a chute to be deposited wherever desired. In traveling through the folder the propelling belt is curved and carries one end of the cork around the cigarette and then curves on the other side, carrying the other end of the cork around the cigarette and overlapping the first end; and a plate then engages the cork seam or lap and finally presses it as the cigarette travels, when the cigarette will be fully tipped. The belt after passing through the folder preferably assumes a flat shape again.

The folders are clearly shown in Figs. 9 and 11 to 19. The folder is preferably formed of a single base plate 136 upon which are secured as by bolts 137, the front folding plate 138 and the rear folding plate 139, which are constructed somewhat similar to the folders in a cigarette making machine. The base 136 of the folder has a gradually formed groove defined by the walls 140, and the tops of the folder continue this groove from opposite sides, one behind the other, so as to act successively upon the cork tip ends. The first top plate 138 has a lip 141, curving over from the left and it serves to curve the propelling belt up on one side, carrying with it one end of the cork tip, until the latter adheres about the cigarette. The curved lip 142 on the top plate 139 of the folder then curves up the opposite side of the belt and with it the remaining end of the cork, when the latter will adhere to the cigarette and will slightly overlap the first end to form a seam. The propelling belt has been shown slightly narrower than the circumference of the cigarette so that it will permit the cork ends to be overlapped without entering in the seam of the cork. In order to finally press or iron the cork seam to cause a proper closing lap we have provided a plate 143, which is shown secured to the second folder plate 139, and this plate has a tongue 144 projecting downwardly, with a slightly grooved end, which extends slightly below the inner surface of the folder. As the folder finishes the overlapping of the cork this tongue presses on the cork seam and completes the seam by an ironing action. As the cigarettes pass from the folder they are discharged by a chute 145 into any desired receptacle from which they are taken and packed.

It will be apparent that a machine of so many details may be altered in many ways without departing from the spirit and scope of our invention.

The machine is automatic in its action. The cigarettes are fed one at a time upon the carrier, when they are conveyed singly to the tip receiving position when the cork is fed beneath the cigarette end and the cigarette is pressed upon the pasted side of the tipping material. The cigarette is then released and is propelled with the cork through the folder which folds the tip ends about the cigarette, the belt not only serving to propel the cigarette through the folder, but also to keep the tip from being dislodged from its original point of partial adhesion to the cigarette until the tip has been fully applied. Once the cigarette is brought in contact with the tip it continues to travel in one direction until fully tipped and there are no complicated reciprocating parts required for applying the tip. The mechanism for supplying the cigarettes to the carrier is new and effective and the means for carrying the cigarettes and presenting them properly to the tipping mechanism is also novel and effective.

Though we have carefully described all details of the preferred embodiment of our invention we do not wish to be limited in the scope of our protection to the same.

Having described our invention what we claim is;

1. In a cigarette tipping machine the combination, of a folder adapted to wrap the ends of a tip about a cigarette as the latter passes therethrough, a belt adapted to propel the cigarettes through the folder, a support in juxtaposition to the belt, means for feeding the end of a pasted strip of tipping material over said support, upper and lower cutting blades for severing a piece of the tipping material transversely, means for presenting cigarettes successively for tipping, a swinging member adapted to move the end of the cigarette in contact with the upper cutting blade, a pressing finger adapted to press the cigarette upon the severed tip and belt, and guides near the said support, adapted to guide the cigarette laterally as it is fed to the tipping material.

2. In a cigarette tipping machine the combination, of a folder adapted to wrap the ends of a tip about a cigarette as the latter passes therethrough, a belt adapted to propel the cigarettes through the folder, a support in juxtaposition to the belt, means for intermittently feeding the end of a pasted strip of tipping material over said support, upper and lower cutting blades for severing a piece of the tipping material transversely, means for presenting cigarettes successively for tipping, a swinging member adapted to move the end of the cigarettes in contact with the upper cutting blade, a pressing finger adapted to press the cigarette upon the severed tip and belt, and guides near the said support, adapted to guide the cigarette laterally as it is fed to the tipping material.

3. In a cigarette tipping machine the combination, of a folder adapted to wrap the ends of a tip about a cigarette as the latter passes therethrough, a continuously moving belt adapted to propel the cigarettes through said folder, a support in juxtaposition to the belt, means for intermittently feeding the end of a pasted strip of tipping material over said support, an upper cutting blade for severing a piece of the tipping material transversely, means for presenting cigarettes successively for tipping, a swinging member adapted to move the end of the cigarettes in contact with the upper cutting blade, a pressing finger adapted to press the cigarette upon the severed tip and belt, and guides near the said support, adapted to guide the cigarettes laterally as they are fed to the tipping material.

4. In a cigarette tipping machine the combination of means for tipping cigarettes, a carrier for presenting the cigarettes successively to the tipping means, comprising a stationary and a movable member adapted to move the cigarettes along the stationary member and means for feeding cigarettes to the carrier, comprising a hopper and a cut off therefor, and a reciprocating lifter adapted to receive the cigarettes singly from the hopper and lift them whereby they will be removed therefrom by the movable carrier member and advanced along the stationary carrier member.

5. In a cigarette tipping machine the combination of means for tipping cigarettes, a carrier for presenting cigarettes successively for tipping, comprising a stationary member and a reciprocating member adapted to advance the cigarettes along the stationary member and means for feeding cigarettes to the carrier, comprising a hopper and a cut off therefor and a reciprocating lifter adapted to receive the cigarettes from the hopper and lift them, whereby the movable carrier element will take under the cigarette upon the reciprocations of the said carrier member and carry the cigarette to the stationary carrier member.

6. In a cigarette tipping machine the combination, of means for tipping cigarettes and a carrier for successively presenting the cigarettes to the tipping device, comprising a hopper, having an inclined bottom continued exteriorly of the hopper, a cut off for the hopper, a reciprocating raising member having a groove for receiving the cigarette as it passes down the hopper bottom, and a guard, said movable carrier element being adapted to engage under the cigarette as it is raised, to remove it from the raising element.

7. In a cigarette tipping machine the combination, of means for tipping cigarettes and a carrier for successively presenting cigarettes to the tipping device, comprising a movable element, and means for supplying cigarettes to the carrier, comprising a hopper having an inclined bottom provided with an aperture, an oscillating agitator adapted to engage the cigarettes through said aperture in the hopper bottom, a cut off near the said agitator and a lifter for lifting the cigarettes as they are released from the hopper, said movable carrier element being adapted to receive the cigarettes as they are presented by said lifter.

8. In a cigarette tipping machine the combination, of means for tipping cigarettes and a carrier for successively presenting the cigarettes to the tipping device, comprising a movable element and means for supplying cigarettes to the carrier, comprising a hopper and a cut off therefor, a lifter adapted to lift the cigarettes as they are discharged from the hopper, said movable carrier having a groove to receive the cigarettes from the lifter and a movable member adapted to be engaged by the carrier, lying above the carrier groove and adapted to remove any excess cigarettes which may be fed to the carrier groove.

9. In a cigarette tipping machine, the combination, of means for tipping cigarettes and a carrier for successively presenting cigarettes to the tipping device, comprising a movable element, and means for supplying cigarettes to the carrier, comprising a hopper and a cut off therefor, an exterior shelf for receiving the cigarettes as they discharge from the hopper, a rocking frame having a grooved lifter, the said shelf being adapted to discharge the cigarettes in the groove of the lifting plate, a guard for the lifting plate, means for rocking said frame to raise the lifting plate and means operated by the rocking frame for operating the cut off, said carrier being adapted to take under the cigarette as it is raised by the lifting plate to receive the cigarette therefrom.

10. In a cigarette tipping machine the combination of means for tipping cigarettes, a supply receptacle and a carrier for successively conveying cigarettes from the supply to the tipping means, comprising a stationary support and a movable element for moving the cigarettes step by step along the stationary support and a cam for operating the movable carrier element, having a plurality of camming projections said movable carrier member having a cam pocket having rectangularly disposed cam faces coöperating with said cam to produce a rectangular movement in the said movable element whereby the cigarettes will be moved step by step along the stationary support.

11. In a cigarette tipping machine the combination, of means for tipping cigarettes, a supply receptacle and a carrier for successively conveying cigarettes from the supply to the tipping device, comprising a stationary support and a movable element for moving the cigarettes step by step along the stationary support and a plurality of similar cams for operating the movable element having a plurality of camming projections, said movable carrier element having means forming a single cam face for one of said cams and a plurality of rectangularly disposed cam faces engaging the other of said cams, to produce a rectangular movement in the said movable element, whereby the cigarettes will be moved step by step along the stationary support.

12. A cigarette tipping machine comprising means for tipping cigarettes, a carrier for conveying the cigarettes to the tipping device and a cigarette turning device, comprising means manually initiated and automatically operated, and adapted to turn a cigarette on the carrier.

13. A cigarette tipping machine comprising means for tipping cigarettes, a carrier for conveying the cigarettes to the tipping device and a turning device, comprising means adapted to be manually initiated and to be operated by the carrier to turn a cigarette on the carrier.

14. A cigarette tipping machine comprising means for tipping cigarettes, a carrier for conveying the cigarettes to the tipping device and a turning device, comprising means for turning cigarettes as they successively appear in a given position on the carrier, means automatically operated by the machine for operating the turning means and means for manually initiating said turning means.

15. A cigarette tipping machine comprising means for tipping cigarettes, a carrier for conveying the cigarettes to the tipping device and a turning device, comprising means for turning cigarettes as they successively appear in a given position on the carrier, said turning device being automatically operated by the carrier and means for manually initiating the operation of the turning device.

16. A cigarette tipping machine comprising means for tipping cigarettes and means for conveying cigarettes thereto, comprising a stationary support and a movable support adapted to advance the cigarettes step by step along the stationary support and a turning device adapted to turn a cigarette on the carrier, said turning device being operated by said movable carrier support and means for manually initiating the operation of said turning device.

17. A cigarette tipping machine comprising means for tipping cigarettes and means for conveying cigarettes thereto, and a turning device, comprising a lever adapted to engage a cigarette on the carrier to turn the same, a floating shaft carrying said lever, said lever being adapted to be tripped by the said carrier and manually operated means for moving said shaft to place the said lever into operative relation with said carrier.

18. A cigarette tipping machine comprising means for tipping cigarettes and means for conveying cigarettes thereto comprising a stationary support and a movable support adapted to advance the cigarettes step by step along the stationary support and a cigarette turning device comprising a manually operated shaft carrying a supporting element, a floating shaft carried thereby, a lever carried by the floating shaft and adapted to turn the cigarettes as they successively appear at a given location on the stationary support, said lever being adapted to be rocked by the said movable carrier element when positioned therefor by the manually operated means.

19. In a cigarette tipping machine the combination of means for wrapping the ends of a tip about a cigarette as the latter is propelled therethrough, a belt arranged to propel cigarettes through said wrapping means, means for feeding tipping material in juxtaposition to said belt, and means for depositing cigarettes on said belt and tipping material, comprising a stationary supporting member and a movable member for moving the cigarettes along the stationary member, a cam arranged to operate said movable carrier element and cam faces carried by said movable carrier element, coöperating with said cam whereby said movable carrier element will be moved rectangularly, the said movable carrier element being adapted to deposit the cigarettes upon the said belt and tipping material upon its downward vertical movement and to withdraw therefrom upon its horizontal movement.

Signed this 11th day of February, 1910, at the city, county and State of New York.

JULIUS C. DRUCKLIEB.
CASPAR SIMON.

Witnesses:
EDWARD D. C. SPERRY,
SHELDON A. DU CRET.

Copies of this patent may be obtained for five cents each, by addressing the "Commissioner of Patents, Washington, D. C."